(12) United States Patent
Gim et al.

(10) Patent No.: US 12,135,488 B2
(45) Date of Patent: Nov. 5, 2024

(54) LIGHT MODULATING DEVICE

(71) Applicant: LG Chem, Ltd., Seoul (KR)

(72) Inventors: Min Jun Gim, Daejeon (KR); Dong Hyun Oh, Daejeon (KR); Jung Sun You, Daejeon (KR); Jin Hong Kim, Daejeon (KR); Jung Woon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/010,558

(22) PCT Filed: Jul. 29, 2021

(86) PCT No.: PCT/KR2021/009926
§ 371 (c)(1),
(2) Date: Dec. 15, 2022

(87) PCT Pub. No.: WO2022/025684
PCT Pub. Date: Feb. 3, 2022

(65) Prior Publication Data
US 2023/0258992 A1 Aug. 17, 2023

(30) Foreign Application Priority Data
Jul. 31, 2020 (KR) .................. 10-2020-0095864

(51) Int. Cl.
*G02F 1/137* (2006.01)
*G02F 1/1337* (2006.01)
(Continued)

(52) U.S. Cl.
CPC ............ *G02F 1/137* (2013.01); *G02F 1/1337* (2013.01); *G02F 1/1393* (2013.01);
(Continued)

(58) Field of Classification Search
None
See application file for complete search history.

(56) References Cited

U.S. PATENT DOCUMENTS 10,768,461 B2 * 9/2020 Lee ............... G02F 1/1396
2015/0131033 A1 5/2015 Min et al.
(Continued)

FOREIGN PATENT DOCUMENTS

CN 104961894 A 10/2015
CN 104641282 B 5/2017
(Continued)

OTHER PUBLICATIONS

Extended European Search Report for Application No. 21849685.9 dated Dec. 6, 2023. 8 pgs.
(Continued)

*Primary Examiner* — Dung T Nguyen
(74) *Attorney, Agent, or Firm* — Lerner David LLP

(57) ABSTRACT

A light modulating device is disclosed herein. In some embodiments, a light modulating device includes a first substrate, a second substrate, and a liquid crystal layer, wherein the liquid crystal layer is disposed between the first and second substrates, and wherein the light modulating device satisfies Equation 1: $T_2 \leq 3 \times T_1$, wherein, $T_1$ is an initial transmittance measured after vertically orienting the liquid crystal layer and placing it between orthogonal polarizers, and $T_2$ is a transmittance measured after heating the liquid crystal layer showing the transmittance of $T_1$ at 100° C. for 5 minutes, and then placing it between the orthogonal polarizers. The light modulating device can stably maintain designed optical properties even after an encapsulation process. The light modulating device can also stably main- (Continued)

tain the orientation state of a light modulation layer while effectively securing adhesive force between upper and lower substrates.

10 Claims, 6 Drawing Sheets

(51) Int. Cl.
 *G02F 1/139* (2006.01)
 *G02F 1/1335* (2006.01)
(52) U.S. Cl.
 CPC .... *G02F 1/133528* (2013.01); *G02F 2202/28* (2013.01); *G02F 2203/01* (2013.01)

(56) References Cited

U.S. PATENT DOCUMENTS

| | | | |
|---|---|---|---|
| 2015/0252266 | A1 | 9/2015 | Wang et al. |
| 2017/0108740 | A1 | 4/2017 | Kim et al. |
| 2017/0160594 | A1 | 6/2017 | Lan et al. |
| 2018/0074377 | A1 | 3/2018 | You et al. |
| 2018/0258346 | A1 | 9/2018 | Yun et al. |
| 2019/0107742 | A1 | 4/2019 | Jeon et al. |
| 2019/0203078 | A1 | 7/2019 | Park et al. |
| 2019/0384094 | A1 | 12/2019 | Lee et al. |
| 2021/0116736 | A1 | 4/2021 | Kim et al. |

FOREIGN PATENT DOCUMENTS

| | | | |
|---|---|---|---|
| JP | 2007047460 | A | 2/2007 |
| JP | 4058321 | B2 | 3/2008 |
| JP | 2009053256 | A | 3/2009 |
| JP | 2011190303 | A | 9/2011 |
| JP | 2015168686 | A | 9/2015 |
| JP | 2015529349 | A | 10/2015 |
| JP | 2016060883 | A | 4/2016 |
| JP | 2017513051 | A | 5/2017 |
| JP | 2017181636 | A | 10/2017 |
| JP | 2018507443 | A | 3/2018 |
| JP | 2018532869 | A | 11/2018 |
| JP | 2020518013 | A | 6/2020 |
| JP | 2020518017 | A | 6/2020 |
| KR | 20070073294 | A | 7/2007 |
| KR | 20140036948 | A | 3/2014 |
| KR | 20160100575 | A | 8/2016 |
| KR | 20180059370 | A | 6/2018 |
| KR | 101987371 | B1 | 6/2019 |
| KR | 101987373 | B1 | 6/2019 |
| KR | 101999963 | B1 | 7/2019 |
| KR | 20190076363 | A | 7/2019 |
| KR | 20200024096 | A | 3/2020 |
| TW | 201819583 | A | 6/2018 |
| WO | 2012020628 | A1 | 2/2012 |

OTHER PUBLICATIONS

International Search Report for Application No. PCT/KR2021/009926 mailed Nov. 22, 2021, 2 pages.
Search Report from the Office Action for Taiwanese Application No. 110128108 issued Jun. 13, 2022, 2 pages. [See p. 1, categorizing the cited references].

* cited by examiner

[Figure 1]
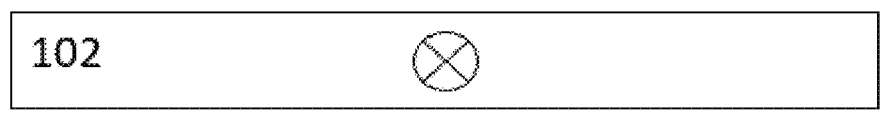
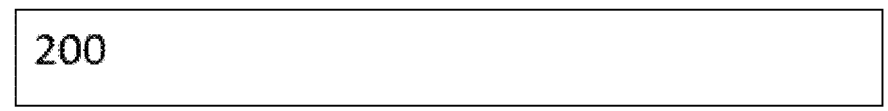
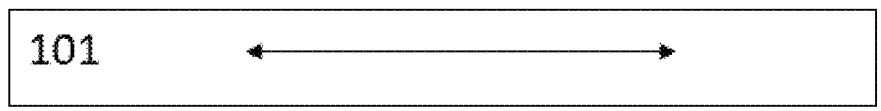
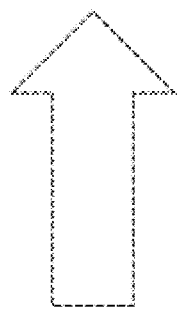

[Figure 2]

| |
|---|
| 100 |
| 1001 |
| 600 |
| 2001 |
| 200 |

[Figure 3]

| |
|---|
| 400 |
| 100 |
| 1001 |
| 600 |
| 2001 |
| 200 |

[Figure 4]

| |
|:---:|
| 400 |
| 100 |
| 1001 |
| 600 |
| 2001 |
| 200 |
| 400 |

[Figure 5]
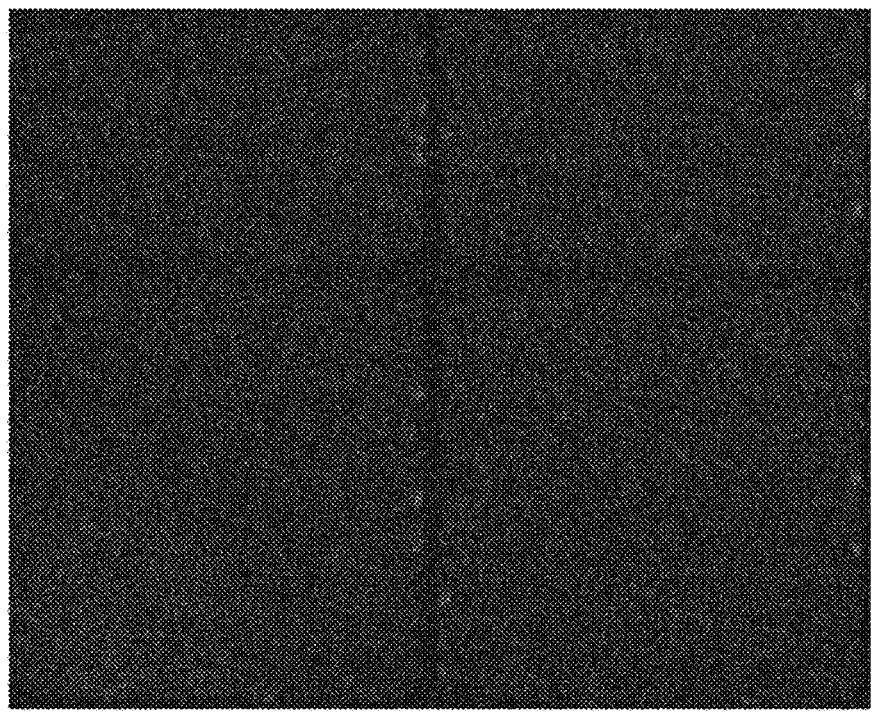

[Figure 6]

LIGHT MODULATING DEVICE

CROSS-REFERENCE TO RELATED APPLICATIONS

This application is a national phase entry under 35 U.S.C. § 371 of International Application No. PCT/KR2021/009926, filed on Jul. 29, 2021, which claims priority based on Korean Patent Application No. 10-2020-0095864, filed on Jul. 31, 2020, the disclosures of which are incorporated by reference herein.

TECHNICAL FIELD

The present application relates to a light modulating device.

BACKGROUND ART

A light modulating device, in which a light modulation layer comprising a liquid crystal compound and the like is positioned between two substrates, is used for various applications.

In order for the light modulating device to exhibit the desired performance, it is important to control the orientation state of the liquid crystal compound between the substrates. Therefore, when the light modulation layer is a liquid crystal layer, a liquid crystal alignment film is formed on both sides of the liquid crystal layer in order to control the orientation of the liquid crystal compound.

Patent Document 1 discloses a light modulating device having a structure in which a liquid crystal alignment film is formed on one side of a liquid crystal layer and an adhesive layer is formed on the other side instead of the liquid crystal alignment film.

It is described therein that since the adhesive layer disclosed in Patent Document 1 has liquid crystal orientation force, the desired orientation of the liquid crystal compound is possible, without applying a liquid crystal alignment film to one side of the liquid crystal layer.

The light modulating device disclosed in Patent Document 1 has an advantage that the adhesive force of two substrates disposed opposite to each other can be maintained excellently because the adhesive has been applied to one substrate.

However, there is a problem that it is not easy to sufficiently stably maintain the orientation of the liquid crystal compound only with the adhesive layer disclosed in Patent Document 1, and in particular, the orientation of the liquid crystal compound is broken under high temperature conditions, thereby causing optical defects.

PRIOR ART DOCUMENTS

Patent Documents (Patent Document 1) Korean Registered Patent Publication No. 1987373

BRIEF DESCRIPTION OF DRAWINGS

FIG. 1 is a diagram showing a process of measuring transmittance $T_1$ and $T_2$.

FIGS. 2 to 4 are schematic diagrams of an exemplary light modulating device of the present application.

FIG. 5 is a result of evaluating high-temperature orientation stability of the light modulating device of Example 1.

FIG. 6 is a result of evaluating high-temperature orientation stability of the light modulating device of Comparative Example 1.

DISCLOSURE

Technical Problem

The present application provides a light modulating device. The present disclosure is intended to provide a light modulating device that stably maintains orientation of a liquid crystal compound at the same time, while securing adhesive force between substrates disposed opposite to each other by applying a pressure-sensitive adhesive layer or adhesive layer, and in particular, is capable of implementing the desired orientation state of the liquid crystal compound even at high temperatures.

Technical Solution

In this specification, the term 'vertical, parallel, orthogonal, or horizontal' defining an angle and an angular numerical value mean 'substantially vertical, parallel, orthogonal, or horizontal' and the substantially numerical value of the angle within a range without impairing the desired effect. The vertical, parallel, orthogonal, or horizontal and the numerical range include errors such as manufacturing errors or deviations (variations). For example, the above cases may each include an error within about ±10 degrees, an error within about ±9 degrees, an error within about ±8 degrees, an error within about ±7 degrees, an error within about ±6 degrees, an error within about ±5 degrees, an error within about ±4 degrees, an error within about ±3 degrees, an error within about ±2 degrees, an error within about ±1 degree, an error within about ±0.8 degrees, an error within about ±0.6 degrees or an error within about ±0.4 degrees.

Among physical properties mentioned in this specification, when the measured temperature affects relevant physical properties, the physical properties are physical properties measured at room temperature, unless otherwise specified. The term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference, refractive index and refractive index anisotropy mentioned in this specification means the phase difference, refractive index and refractive index anisotropy for light with a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

The present disclosure relates to a light modulating device. The term light modulating device may mean a device capable of switching between at least two or more different light states. Here, the different light states may mean states that at least transmittance, reflectance, color and/or haze are different.

An example of the state that the light modulating device can implement includes a transparent, black, high reflection, low-reflection and/or color mode state indicating a specific color and the like, but is not limited thereto.

In one example, the light modulating device may be a device capable of switching between at least the transparent and black mode states.

The transmittance of the light modulating device in the transparent mode may be at least 10% or more, 15% or more, 20% or more, 25% or more, 30% or more, 35% or more, 40% or more, 45% or more, 50% or more, 55% or more, 60% or more, 65% or more, 70% or more, 75% or more, or 80% or more. In another example, the transmittance in the transparent mode may also be about 100% or less, 95% or less, 90% or less, or 85% or less or so. However, the upper limit is not particularly limited because the higher the transmittance in the transparent mode, the more advantageous it is.

The transmittance of the light modulating device in the black mode state may be 60% or less, 55% or less, 50% or less, 45% or less, 40% or less, 35% or less, 30% or less, 25% or less, 20% or less, 15% or less, 10% or less, or 5% or less. In another example, the transmittance in the black mode may also be about 0% or more, 5% or more, 10% or more, 15% or more, 20% or more, or 25% or more or so. However, the lower limit of the transmittance in the black mode sate is not particularly limited because the lower the transmittance in the black mode, the more advantageous it is.

The transmittance may be, for example, linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among the light incident in a direction parallel to the normal direction of the film or sheet surface may be defined as the transmittance.

The transmittance may be each transmittance for any one wavelength in the visible light region, for example, any one wavelength in a range of about 400 to 700 nm or about 380 to 780 nm, or transmittance for the entire visible light region, maximum or minimum transmittance among the transmittance for the entire visible light region, or an average value of the transmittance in the visible region.

In one example, the light modulating device of the present disclosure may be designed to switch between any one state selected from the transparent mode and black mode states, and the other state. If necessary, other third different states or higher states rather than the above states may also be implemented.

The switching of the light modulating device may be controlled depending on whether or not an external signal, for example, an electrical signal such as a voltage is applied. For example, in a state of not applying the external signal, the light modulating device may maintain any one of the above-described states, and then may be switched to another state when a voltage is applied. The state of the mode may be changed or the third different mode state may also be implemented, by changing the intensity, frequency and/or shape of the applied voltage.

The light modulating device of the present disclosure may comprise two substrates disposed opposite to each other and a light modulation layer positioned between the substrates.

Figure 2:
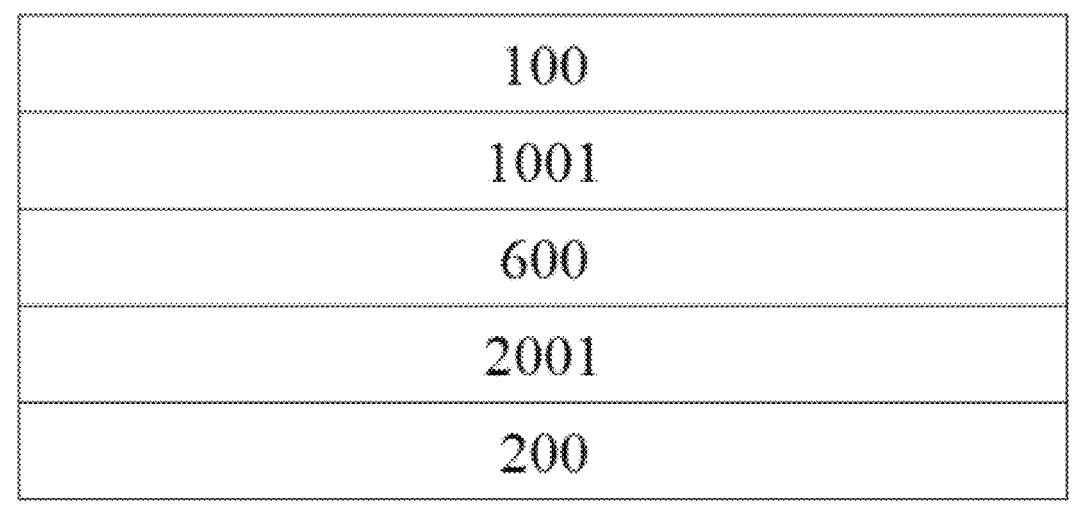

FIG. 2 is a diagram showing one example of the structure. As shown in the drawing, the light modulating device comprises a first substrate (100) and a second substrate (200) which are oppositely disposed. The first and second substrates may each have a first surface and a second surface. Here, the first surface may be one major surface of the substrate, and the second surface may mean a major surface opposite thereto.

A functional layer may be formed on one surface (e.g., the first surface) of the first substrate (100), and a liquid crystal alignment film (2001) may be formed on one surface (e.g., the first surface) of the second substrate (200). Here, the functional layer may be an adhesive layer or a pressure-sensitive adhesive layer to be described below. A light modulation layer (600) is positioned between the oppositely disposed first substrate (100) and second substrate (200). The type of the light modulation layer is not particularly limited, and usually. a liquid crystal layer may be used as the light modulation layer. When the light modulation layer is a liquid crystal layer, a liquid crystal alignment film is usually formed on both surfaces of the first and second substrates (100, 200), but a pressure-sensitive adhesive layer or adhesive layer is formed on the first substrate (100) instead of the liquid crystal alignment film, and a liquid crystal alignment film is formed only on the second substrate (200), whereby the orientation state of the liquid crystal compound, which is very useful in a specific application (e.g., smart window or eyewear), can also be obtained. In this case, a liquid crystal alignment film is not formed on the first substrate. In addition, although not shown in the drawing, in any one of the first and second substrates of the light modulating device, a spacer for maintaining an interval (cell gap) between the first and second substrates is present, but when the functional layer on the first substrate (100) is the pressure-sensitive adhesive layer or adhesive layer (1001), the pressure-sensitive adhesive layer or adhesive layer (1001) is attached to the spacer, thereby being capable of greatly improving lamination force between the first and second substrates.

As the substrate, a known substrate material may be used without particular limitation. For example, an inorganic substrate such as a glass substrate, a crystalline or amorphous silicon substrate or a quartz substrate, or a plastic substrate may be used as the substrate. As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyacrylate) substrate; a PES (poly ether sulfone) substrate; a PEEK (polyetheretherketon) substrate; a PPS (polyphenylsulfone), a PEI (polyetherimide) substrate; a PEN (polyethylenenaphtlatate) substrate; a polyester substrate such as a PET (polyethyleneterephtalate) substrate; a PI (polyimide) substrate; a PSF (polysulfone) substrate; a PAR (polyarylate) substrate or a substrate comprising an amorphous fluororesin or the like may be used, without being limited thereto. The thickness of such a substrate is not particularly limited, which may be selected within an appropriate range.

In one example, as the substrate, an optically anisotropic film may also be applied. A film having such optical anisotropy is also usually anisotropic in mechanical properties, and it is possible to provide a light modulating device having superior durability and the like by utilizing such anisotropy.

In one example, the anisotropic film may have an in-plane phase difference of about 500 nm or more. The in-plane phase difference is a value for light with a wavelength of 550 nm, and is a physical quantity defined by the following Equation A. In another example, the in-plane phase difference of the retardation film may be 600 nm or more, 700 nm or more, 800 nm or more, 900 nm or more, 1000 nm or more, 1100 nm or more, 1200 nm or more, 1300 nm or more, 1400 nm or more, 1500 nm or more, 2000 nm or more, 2500 nm or more, 3000 nm or more, 3500 nm or more, 4000 nm or more, 4500 nm or more, 5000 nm or more, 5500 nm or more, 6000 nm or more, 6500 nm or more, 7000 nm or more, 7500 nm or more, 8000 nm or more, 8500 nm or more, 9000 nm or more, or 9500 nm or more, or may also be 100000 nm or less, 90000 nm or less, 80000 nm or less, 70000 nm or less, 60000 nm or less, 50000 nm or less, 40000 nm or less, 30000 nm or less, 20000 nm or less, 15000 nm or less, 14000 nm or less, 13000 nm or less, 12000 nm or less, 10000 nm or less, 9500 nm or less, 9000 nm or less, 8500 nm or less, 8000 nm or less, 7500 nm or less, 7000 nm or less, 6500 nm or less, 6000 nm or less, 5500 nm or less, 5000 nm or less, or 4500 nm or less or so.

A specific kind of the film applicable to the substrate is not particularly limited as long as it exhibits an in-plane phase difference in the above-mentioned range. For example, an anisotropic polymer film to which optical anisotropy is imparted by stretching may be applied. The polymer film may be exemplified by, for example, a polyolefin film such as a polyethylene film or a polypropylene film, a cycloolefin polymer (COP) film such as a polynorbornene film, a polyvinyl chloride film, a polyacrylonitrile film, a polysulfone film, a polyacrylate film, a PVA (poly(vinyl alcohol)) film or a cellulose ester-based polymer film such as a TAC (triacetyl cellulose) film, a polyester film or a polycarbonate film, or a copolymer film of two or more monomers among monomers forming the polymer, and the like.

In one example, as the film, a polyester film such as a PET (poly(ethylene terephthalate)) film may be applied. That is, a film exhibiting an in-plane phase difference in the above-described range is known in the industry, and in the case of a polymer film, such a film exhibits asymmetry even in mechanical properties by stretching or the like in the manufacturing process as well as optically large anisotropy. A representative example of such a retardation film known in the industry is a stretched polyester film such as a stretched PET (poly(ethylene terephthalate)) film.

Therefore, in one example, a polyester film such as a PET film may be applied as the film, but the type of film applicable as a substrate in the present disclosure is not limited thereto.

In addition, the in-plane phase difference is a physical quantity according to Equation A below.

$$Rin = d \times (nx - ny) \quad \text{[Equation A]}$$

In Equation A, Rin is the in-plane phase difference, nx is the refractive index of the film in the slow axis direction, ny is the refractive index of the film in the fast axis direction, and d is the thickness of the film. Here, the meanings of the slow axis and the fast axis are known in the industry.

When the anisotropic film is simultaneously applied to the first and second substrates, the substrates may be disposed such that their slow axes are parallel or perpendicular to each other.

The light modulation layer present between the substrates is a functional layer capable of changing light transmittance, reflectivity, haze and/or color, etc., alone or in conjunction with other components, depending on whether or not an external signal is applied. Such a light modulation layer may be referred to as an active light modulation layer herein.

In this specification, the external signal may mean an external factor, for example, an electric signal such as a voltage, which may affect the behavior of a light modulation material (for example, a liquid crystal compound) included in the light modulation layer (for example, liquid crystal layer). Therefore, a state without any external signal may mean a state where no electrical signal is applied from the outside. The state without any external signal may also be referred to as an initial state.

In the present disclosure, the type of the light modulation layer is not particularly limited as long as it has the above-described functions, and a known light modulation layer can be applied. The light modulation layer may be, for example, a liquid crystal layer, an electrochromic material layer, a photochromic material layer, an electrophoretic material layer, or a dispersed particle orientation layer.

In one example, the liquid crystal layer may be applied as the light modulation layer. The liquid crystal layer is a layer containing a liquid crystal compound. In this specification, the range of the term liquid crystal layer includes all layers containing a liquid crystal compound, and for example, a so-called guest host layer comprising a liquid crystal compound (liquid crystal host) and a dichroic dye, or a layer comprising other additives such as a chiral dopant together with a liquid crystal compound is also a kind of liquid crystal layer defined in this specification. The liquid crystal layer may comprise a liquid crystal compound formed such that the orientation direction changes depending on whether or not an external signal is applied. As the liquid crystal compound, any kind of liquid crystal compound can be used as far as the orientation direction can be changed by application of an external signal. For example, a smectic liquid crystal compound, a nematic liquid crystal compound or a cholesteric liquid crystal compound can be used as the liquid crystal compound. Furthermore, the liquid crystal compound may be, for example, a compound which has no polymerizable group or crosslinkable group so that the orientation direction can be changed by application of an external signal, or may be a compound that exists in a non-polymerized and crosslinked state, even if it has the group.

The liquid crystal layer may comprise a liquid crystal compound whose dielectric constant anisotropy is positive or negative. The absolute value of the dielectric constant anisotropy of the liquid crystal can be appropriately selected in consideration of the object of the present disclosure. The term dielectric constant anisotropy ($\Delta\varepsilon$) may mean a difference ($\varepsilon// - \varepsilon\perp$) between the horizontal dielectric permittivity ($\varepsilon//$) and the vertical permittivity ($\Delta\perp$) of the liquid crystal. In this specification, the term horizontal permittivity ($\varepsilon//$) means a dielectric constant value measured along the direction of an electric field in a state where a voltage is applied so that the director of the liquid crystal and the direction of the electric field by the applied voltage are substantially horizontal, and the vertical permittivity ($\varepsilon\perp$) means a dielectric constant value measured along the direction of an electric field in a state where a voltage is applied so that the director of the liquid crystal and the direction of the electric field by the applied voltage are substantially perpendicular.

For example, the refractive index anisotropy ($\Delta n$) of the liquid crystal layer may be in a range of 0.01 to 0.5. In another example, the refractive index anisotropy may be 0.02 or more, 0.03 or more, 0.04 or more, 0.05 or more, 0.06 or more, 0.07 or more, 0.08 or more, 0.085 or more, or may be 0.45 or less, 0.4 or less, 0.35 or less, 0.3 or less, 0.25 or less, 0.2 or less, 0.15 or less or 0.1 or less or so. The refractive index anisotropy of the liquid crystal layer is selected according to the purpose, which is not limited thereto.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode or R-TN (reversed twisted nematic) mode, and the like.

The liquid crystal layer of the present disclosure may be designed (formed) to be capable of implementing at least twisted orientation in the above modes. The twisted orientation means a state where the liquid crystal compounds in the liquid crystal layer are oriented in a twisted form based on an imaginary spiral axis, and this twisted orientation may be implemented in a state where the liquid crystal compounds of the liquid crystal layer are horizontally oriented, vertically oriented, obliquely oriented or spray-oriented. In addition, the twisted orientation may be implemented in the initial state of the liquid crystal layer or may also be implemented in a state to which an external signal is applied.

In one example, the liquid crystal layer may be designed (formed) to be capable of switching at least between the vertical orientation state and the twisted orientation state. For example, it may implement any one of the two states in the initial state, or may be switched to the other state when an external signal (e.g., an electrical signal such as a voltage) is applied. In one example, the vertical orientation state may be implemented in the initial state.

The light modulating device of the present disclosure may be designed so that the orientation state (particularly, the vertical orientation state) of the liquid crystal layer as above may be stably maintained even at a high temperature.

For example, the light modulating device comprising: first and second substrates each having a first surface and a second surface, and disposed oppositely such that their first surfaces face each other; and a liquid crystal layer present between the first and second substrates may satisfy Equation 1 below.

$$T_2 \leq 3 \times T_1$$ [Equation 1]

In Equation 1, $T_1$ is the initial transmittance measured after vertically orienting the liquid crystal layer and placing it between orthogonal polarizers, and $T_2$ is the transmittance measured after maintaining the liquid crystal layer showing the transmittance of $T_1$ at 100° C. for 5 minutes in a vertically oriented state, and then placing it between the orthogonal polarizers.

Here, the unit of $T_1$ and $T_2$ is %. In addition, here, the initial transmittance $T_1$ is measured at room temperature, and the transmittance $T_2$ is measured in a state where the temperature is maintained at 100° C. for 5 minutes and then maintained at 100° C. as it is.

In addition, the measurement wavelength of the transmittance $T_1$ and $T_2$ is a visible light wavelength (380 nm to 770 nm).

FIG. 1 is a diagram showing a process of confirming the $T_1$ and $T_2$.

As shown in FIG. 1, the transmittance $T_1$ and $T_2$ may be measured in a state where the liquid crystal layer or the light modulating device (200) is positioned between two sheets of orthogonal polarizers (101, 102). At this time, as shown in FIG. 1, the transmittance is the transmittance measured, after allowing light to be incident on the other polarizer (102) of two sheets of orthogonal polarizers (101, 102) (in the direction of the arrow in FIG. 1), from any one polarizer (101) side.

The orthogonal polarizers mean a state in which the light absorption axes of two sheets of polarizers are perpendicular to each other. In general, when the transmittance is measured in a state where the light absorption axis of one polarizer of two sheets of polarizers is fixed while the light absorption axis of the other polarizer is rotated with respect to the light absorption axis, the point where the lowest transmittance appears is regarded as the point where the light absorption axes of two sheets of polarizers are perpendicular to each other.

The liquid crystal layer is positioned between two orthogonal polarizers as shown in FIG. 1 in the case of the vertical orientation state, and if the transmittance is measured, the transmittance is measured to be low. Therefore, the $T_1$ appears as a very low numerical value. When the vertical orientation property of the liquid crystal layer is damaged or deteriorated while the liquid crystal layer is maintained at a high temperature for a certain period of time (maintained at 100° C. for 5 minutes) in a vertically oriented state, the $T_2$ thus measured appears higher than $T_1$. In the process of measuring $T_1$ and $T_2$ above, when the first and/or second substrate of the light modulating device is an anisotropic substrate, the slow axis of the relevant substrate is arranged to be parallel to the light absorption axis of any one polarizer of two sheets of polarizers.

However, in the light modulating device of the present disclosure, the orientation property (especially vertical orientation property) of the liquid crystal layer can be stably maintained even at a high temperature, so that $T_2$ above may be 3 times or less of $T_1$ ($3 \times T_1$ or less). In another example, $T_2$ above may also be 2.5 times or less of $T_1$ ($2.5 \times T_1$ or less), 2 times or less of $T_1$ ($2 \times T_1$ or less), 1.5 times or less of $T_1$ ($1.5 \times T_1$ or less), or 1 time or less of $T_1$ ($T_1$ or less) or so. The lower limit of $T_2$ above is not particularly limited, and in one example, it may also be 0.5 times or more of $T_1$ ($0.5 \times T_1$ or more), 0.7 times or more of $T_1$ ($0.7 \times T_1$ or more), or 0.9 times or more of $T_1$ ($0.9 \times T_1$ or more). In one example, $T_1$ and $T_2$ may be substantially the same.

The specific numerical value of $T_2$ is not particularly limited, but in one example, it may be 2% or less or so. In another example, $T_2$ may be 1.8% or less, 1.6% or less, 1.4% or less, 1.2% or less, 1% or less, 0.8% or less, 0.6% or less, 0.4% or less, or 0.2% or less or so. The lower limit of $T_2$ is not limited, and for example, $T_2$ may be 0% or more.

A method of measuring $T_1$ and $T_2$ above is specifically described in Examples.

The light modulation layer, which is a liquid crystal layer, basically comprises the liquid crystal compound, which may also comprise additional components if necessary.

For example, the liquid crystal layer, which is the light modulation layer, may also comprise a so-called chiral dopant together with the liquid crystal compound. Such a chiral dopant may induce the orientation of the helical structure, that is, the twisted orientation in the liquid crystal compound.

The chiral dopant that can be included in the light modulation layer can be used without particular limitation as long as it can induce a desired rotation (twisting) without deteriorating the liquid crystallinity, for example, the nematic regularity. The chiral dopant for inducing rotation in the liquid crystal molecules needs to include at least chirality in the molecular structure. The chiral dopant may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral dopant may be, for example, a low molecular weight compound having a molecular weight of 1,500 or less. As the chiral dopant, commercially available chiral nematic liquid crystals, for example, chiral dopant liquid crystal S811 commercially available from Merck Co., Ltd. or BASF's LC756 may be applied.

There is also no particular limitation on the ratio of the chiral dopant, but it may be added so that the ratio (d/p) of the thickness (d, cell gap) of the light modulation layer to the pitch (pitch of the twisted orientation) (p) of the helical structure of the liquid crystal compound generated by the addition of the chiral dopant may satisfy a K value to be described below.

The pitch (p) of the so-called twist-oriented light modulation layer (liquid crystal layer) to which the chiral dopant is applied may be measured by a measurement method using a wedge cell, and it may be measured by a method described in Simple method for accurate measurement of the cholesteric pitch using a stripe-wedge Grandjean-Cano cell of D. Podolskyy, et al. (Liquid Crystals, Vol. 35, No. 7, Jul. 8, 2008, 789-791). In addition, the content (weight %) of the chiral dopant is calculated by an equation of 100/(HTP (helical twisting power)×pitch (nm)), which may be selected in an appropriate ratio in consideration of the desired pitch (p).

The liquid crystal layer may be designed such that the ratio (d/p) of the thickness (d, cell) of the light modulation layer (liquid crystal layer) to the pitch (p) of the twisted orientation is less than 1. In another example, the ratio (d/p) may be 0.95 or less, 0.9 or less, 0.85 or less, 0.8 or less, 0.75 or less, 0.7 or less, 0.65 or less, 0.6 or less, 0.55 or less, 0.5 or less, 0.45 or less, 0.4 or less, 0.35 or less, 0.3 or less, 0.25 or less, or 0.2 or less, or may also be 0.1 or more, 0.15 or more, 0.2 or more, 0.25 or more, 0.3 or more, 0.35 or more, 0.4 or more, 0.45 or more, or 0.5 or more or so.

The liquid crystal layer may be designed so that the pitch (p) of the twisted orientation is in the range of 1 to 100 μm. In another example, the ratio may be 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, 19 μm or more, or 19.5 μm or more, or may also be 95 μm or less, 90 μm or less, 85 μm or less, 80 μm or less, 75 μm or less, 70 μm or less, 65 μm or less, 60 μm or less, 55 μm or less, 50 μm or less, 45 μm or less, 40 μm or less, 35 μm or less, 30 μm or less, or 25 μm or less or so.

The thickness (d, cell gap) of the liquid crystal layer may be in the range of 0.5 μm to 50 μm. In another example, the thickness (d, cell gap) may be 1 μm or more, 1.5 μm or more, 2 μm or more, 2.5 μm or more, 3 μm or more or 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, 9.5 μm or more, or 10 μm or more, or may also be 48 μm or less, 46 μm or less, 44 μm or less, 42 μm or less, 38 μm or less, 36 μm or less, 34 μm or less, 32 μm or less, 30 μm or less, 28 μm or less, 26 μm or less, 24 μm or less, 22 μm or less, 20 μm or less, 18 μm or less, 16 μm or less, 14 μm or less, 12 μm or less, or 10 μm or less or so.

Through such a design, it is possible to provide a light modulating device in which the object of the present disclosure is more efficiently achieved.

In the light modulation layer (liquid crystal layer), other necessary additional components (e.g., dichroic dye, etc.) may also be included.

In the case of forming an adhesive layer or a pressure-sensitive adhesive layer on the first surface of the first substrate in the light modulating device, the type of the pressure-sensitive adhesive layer or the adhesive layer is not particularly limited, but a silicone-based pressure-sensitive adhesive layer or a silicone-based adhesive layer may be applied in terms of the fact that it is blended with a compound of the following formula 1 (hereinafter, may be referred to as a silicon compound) to easily exert the desired effect. For example, there are various types of silicone-based pressure-sensitive adhesives or silicone-based adhesives known in the industry as so-called OCAs (optically clear adhesives) or OCRs (optical clear resins), and these pressure-sensitive adhesives or adhesives can be combined a liquid crystal alignment film in a state where a silicon compound to be described below is included to induce suitable orientation of the liquid crystal compound.

That is, the specific surface characteristics of the silicone-based pressure-sensitive adhesive or adhesive comprising the silicon compound may induce the orientation state of the liquid crystal compound suitable for the purpose in combination with the liquid crystal alignment film (especially, vertical alignment film).

As the silicone-based pressure-sensitive adhesive or adhesive, a cured product of a curable silicone adhesive or pressure-sensitive adhesive composition (hereinafter, may be simply referred to as a curable silicone composition) may be used. The type of curable silicone composition is not particularly limited, and for example, a heat-curable silicone composition or an ultraviolet-curable silicone composition may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1_2SiO_{2/2}$ and a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$, an organopolysiloxane copolymer comprising a siloxane unit represented by $R^1R_2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

In addition, the addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula I below.

  [Formula I]

In Formula I, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+c×2+d is 4.

In the definition of Formula I, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula I, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula I, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula II may be used.

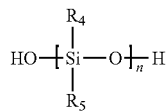

[Formula II]

In Formula II, $R^4$ and $R^5$ each independently represent a hydrogen atom or a substituted or unsubstituted monovalent hydrocarbon group, where when a plurality of $R^4$ and $R^5$ are present, they may be the same or different from each other, and n represents an integer of 5 to 2,000.

In the definition of Formula II, the specific type of the monovalent hydrocarbon group may include, for example, the same hydrocarbon group as the case of Formula I above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present disclosure. That is, basically, all silicone pressure-sensitive adhesives or adhesives known as OCA or OCR, and the like in the industry can be applied in the present disclosure.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion object is bonded. The liquid pressure-sensitive adhesive or adhesive or curable composition is referred to as a so-called optical clear resin (OCR), which may be cured after the adhesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

A specific silicon compound is contained in the silicone pressure-sensitive adhesive layer or adhesive layer. As the silicon compound, a compound having three or more substituents of the following formula 1 may be applied. Such a compound can effectively form and maintain the orientation of the liquid crystal compound by controlling the surface characteristics and the like of the silicone pressure-sensitive adhesive layer or adhesive layer, and can allow that this orientation is stably maintained even under high-temperature conditions.

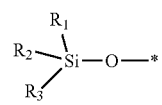

[Formula 1]

In Formula 1, $R_1$ to $R_3$ are each independently a hydrogen atom or an alkyl group, but at least two of $R_1$ to $R_3$ may be alkyl groups. In addition, in Formula 1, * means that the corresponding site is linked.

In Formula 1, the alkyl group may be a linear, branched or cyclic alkyl group having 1 to 20 carbon atoms, 1 to 16 carbon atoms, 1 to 12 carbon atoms, 1 to 8 carbon atoms or 1 to 4 carbon atoms. Such an alkyl group may be optionally substituted by one or more substituents, or may be an unsubstituted alkyl group.

In one example, the alkyl group of Formula 1 above may be a linear or branched alkyl group having 1 to 20 carbon atoms, 1 to 16 carbon atoms, 1 to 12 carbon atoms, 1 to 8 carbon atoms or 1 to 4 carbon atoms, or may be a linear alkyl group.

In one example, any one of $R_1$ to $R_3$ in Formula 1 may be a hydrogen atom, and the other two may be the alkyl groups.

Furthermore, in one example, any one of $R_1$ to $R_3$ in Formula 1 may be a hydrogen atom, and the other two may be linear or branched alkyl groups having 1 to 20 carbon atoms, 1 to 16 carbon atoms, 1 to 12 carbon atoms, 1 to 8 carbon atoms or 1 to 4 carbon atoms, or may be linear alkyl groups, and such an alkyl group may be optionally substituted with one or more substituents, or may be an unsubstituted alkyl group.

The compound having three or more substituents of Formula 1 above may contain 3 to 10, 3 to 9, 3 to 8, 3 to 7, 3 to 6, 3 to 5 or 3 to 4 substituents of Formula 1 above.

As the compound, various types of compounds containing the substituent of Formula 1 above may be applied, and one example is a compound represented by Formula 2 below.

[Formula 2]

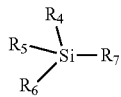

In Formula 2, $R_4$ to $R_7$ are each independently hydrogen, an alkyl group or a substituent of Formula 1, but three or more or all of $R_4$ to $R_7$ are substituents of Formula 1 above.

In Formula 2, the alkyl group may be a linear, branched or cyclic alkyl group having 1 to 20 carbon atoms, 1 to 16 carbon atoms, 1 to 12 carbon atoms, 1 to 8 carbon atoms or 1 to 4 carbon atoms. Such an alkyl group may be optionally substituted by one or more substituents, or may be an unsubstituted alkyl group.

In one example, the alkyl group of Formula 2 above may be a linear or branched alkyl group having 1 to 20 carbon atoms, 1 to 16 carbon atoms, 1 to 12 carbon atoms, 1 to 8 carbon atoms or 1 to 4 carbon atoms, or may be a linear alkyl group.

The ratio of the compound (silicon compound) having three or more substituents of Formula 1 above in the silicone pressure-sensitive adhesive layer or adhesive layer is not particularly limited, but the ratio may be adjusted within the range of 1 to 50 weight %. In another example, the ratio may be 2 weight % or more, 3 weight % or more, 4 weight % or more, 5 weight % or more, 6 weight % or more, 7 weight % or more, 8 weight % or more, 9 weight % or more, 10 weight % or more, 11 weight % or more, 12 weight % or more, 13 weight % or more, 14 weight % or more, or 15 weight % or more, or may also be 49 weight % or less, 48 weight % or less, 47 weight % or less, 46 weight % or less, 45 weight % or less, 44 weight % or less, 43 weight % or less, 42 weight % or less, 41 weight % or less, 30 weight % or less, 39 weight % or less, 38 weight % or less, 37 weight % or less, 36 weight % or less, 35 weight % or less, 34 weight % or less, 33 weight % or less, 32 weight % or less, 31 weight % or less, 30 weight % or less, 29 weight % or less, 28 weight % or less, 27 weight % or less, 26 weight % or less, 25 weight % or less, 24 weight % or less, 23 weight % or less, 22 weight % or less, 21 weight % or less, 20 weight % or less, 19 weight % or less, 18 weight % or less, 17 weight % or less, 16 weight % or less, 15 weight % or less, 14 weight % or less, 13 weight % or less, 12 weight % or less, 11 weight % or less, or 10 weight % or less or so. In the above ratio range, it is possible to more effectively secure the desired orientation property and high temperature stability of the liquid crystal compound.

In one example, the compound (silicon compound) having a substituent of Formula 1 above may be selected and applied so that the K value according to Equation 1 below is 2 μm or more.

$$K = A \times B \times D \qquad \text{[Equation 1]}$$

In Equation 1, A is a value determined by Equation 2 below, B is the number of substituents of Formula 1 included in the compound (silicon compound) having three or more substituents of Formula 1, D is the thickness of the silicone pressure-sensitive adhesive layer or adhesive layer. Here, the unit of the thickness (D) of the silicone pressure-sensitive adhesive layer or adhesive layer is μm.

$$A = S/(S+O) \qquad \text{[Equation 2]}$$

In Equation 2, S is the weight of the compound (silicon compound) having three or more substituents of Formula 1 included in the silicone pressure-sensitive adhesive layer or adhesive layer, and O is the weight of the pressure-sensitive adhesive layer or adhesive layer excluding the compound having three or more substituents of Formula 1 above. If the units of the weights of S and O are equal to each other, various units may be used, but g is generally applied.

In another example, the K value of Equation 1 above may be 2.5 or more, or 3 or more, or may be 10 or less, 9 or less, 8 or less, 7 or less, 6 or less, 5 or less, or 4.5 or less or so. Within this range, the desired orientation and high-temperature orientation stability of the liquid crystal compound may be more stably secured.

In Equation 1, A may be, for example, in the range of 0.01 to 0.5. In another example, A may be 0.02 or more, 0.03 or more, 0.04 or more, 0.05 or more, 0.06 or more, 0.07 or more, 0.08 or more, 0.09 or more, 0.10 or more, 0.11 or more, 0.12 or more, 0.13 or more, 0.14 or more, or 0.15 or more, or may also be 0.49 or less, 0.48 or less, 0.47 or less, 0.46 or less, 0.45 or less, 0.44 or less, 0.43 or less, 0.42 or less, 0.41 or less, 0.39 or less, 0.38 or less, 0.37 or less, 0.36 or less, 0.35 or less, 0.34 or less, 0.33 or less, 0.32 or less, 0.31 or less, 0.30 or less, 0.29 or less, 0.28 or less, 0.27 or less, 0.26 or less, 0.25 or less, 0.24 or less, 0.23 or less, 0.22 or less, 0.21 or less, 0.20 or less, 0.19 or less, 0.18 or less, 0.17 or less, 0.16 or less, 0.15 or less, 0.14 or less, 0.13 or less, 0.12 or less, 0.11 or less, or 0.10 or less or so. In the above ratio range, it is possible to more effectively secure the desired orientation property and high temperature stability of the liquid crystal compound. Within this range, the desired orientation and high-temperature orientation stability of the liquid crystal compound may be more stably secured.

D of Equation 1, that is, the thickness of the silicone pressure-sensitive adhesive layer or adhesive layer may be, for example, in the range of 0.5 μm to 50 μm. In another example, the thickness (d, cell gap) may be 1 μm or more, 1.5 μm or more, 2 μm or more, 2.5 μm or more, 3 μm or more or 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, 9.5 μm or more, 10 μm or more, or may also be 48 μm or less, 46 μm or less, 44 μm or less, 42 μm or less, 38 μm or less, 36 μm or less, 34 μm or less, 32 μm or less, 30 μm or less, 28 μm or less, 26 μm or less, 24 μm or less, 22 μm or less, 20 μm or less, 18 μm or less, 16 μm or less, 14 μm or less, 12 μm or less, or 10 μm or less or so. Within this range, the desired orientation and high-temperature orientation stability of the liquid crystal compound may be more stably secured.

When the pressure-sensitive adhesive layer or adhesive layer as above is formed on the first surface of the first substrate, the liquid crystal alignment film may not be formed on the first substrate.

There is no particular limitation on the kind of the liquid crystal alignment film that can be formed on the first surface of the second substrate in the light modulating device. As the alignment film, a known vertical or horizontal alignment film, or other alignment films may be applied in consideration of the desired initial orientation. As for the type of alignment film, a contact alignment film such as a rubbing alignment film or a non-contact alignment film such as a photo-alignment film may be applied. In one example, a vertical alignment film may be used as the alignment film. For example, a combination of a vertical alignment film and a pressure-sensitive adhesive layer or adhesive layer as described above may induce an orientation state of a liquid crystal compound suitable for various applications.

The initial orientation of the liquid crystal compound formed by the liquid crystal alignment films and/or the pressure-sensitive adhesive layer or adhesive layer and the liquid crystal alignment film in the liquid crystal layer, which is a light modulation layer, may be vertical orientation, horizontal orientation, oblique orientation or spray orientation. Also, in the vertical orientation, horizontal orientation, oblique orientation or spray orientation state, the liquid crystal compound may or may not be twisted to exist in twisted orientation or cholesteric orientation. The initial orientation means the orientation of the liquid crystal compound in the initial state described above.

The meaning of the horizontal orientation, oblique orientation, vertical orientation or spray orientation is as known in the art. While the liquid crystal compound of the light modulation layer maintains the horizontal orientation, oblique orientation, vertical orientation or spray orientation state in the initial state, it can be changed to the other orientation states according to an external signal.

In one example, the initial orientation of the liquid crystal compound in the light modulation layer may be vertical orientation or an orientation state similar to the vertical orientation, and the twisted orientation may be implemented when an external signal is applied. Such an orientation state is obtained by applying a vertical alignment film as the liquid crystal alignment film. This orientation is useful in an element implementing so-called R-TN (reversed twisted nematic) orientation.

The in-plane phase difference (based on a wavelength of 550 nm) of the light modulation layer in the vertical orientation or an orientation state similar to the vertical orientation may be, for example, about 30 nm or less, 25 nm or less, 20 nm or less, 15 nm or less, 10 nm or less, or 5 nm or less, or may be 0 nm or more, or more than 0 nm.

The in-plane phase difference is obtained according to Equation A above, and in this case, nx, ny and d in Equation A are the slow axis direction refractive index, the fast axis direction refractive index and the thickness of the light modulation layer, respectively.

The light modulating device may further comprise a spacer for maintaining a distance between the first and second substrates. As the spacer, a ball spacer, a column spacer or a partition wall spacer, or a combination of two or more of the foregoing, which is a commonly applied spacer, may be applied. In a suitable example, the partition wall spacer may be used as the spacer, and in particular, the partition wall spacer in which the partition walls form at least one closed figure may be applied. As the closed figure formed by the partition wall spacer, a hexagon (e.g., a regular hexagon, etc.) or a quadrangle (e.g., a square or a rectangle) may be exemplified. The partition wall spacer whose closed figure is a hexagon, particularly a regular hexagon, is also called a so-called honeycomb type spacer. When the shape of the partition spacer formed on the substrate is observed from the normal direction of the substrate, such a honeycomb or quadrangular partition spacer means the case where the figure formed by the partition spacer is a honeycomb type or a quadrangle type, as is well-known. The honeycomb type is usually a combination of regular hexagons, and in the case of the quadrangle type, there may be a square, a rectangle, or a combination of a square and a rectangle, and the like. A partition wall spacer may be used as the spacer in consideration of the adhesion between the first and second substrates, but is not limited thereto.

The pitch of the spacer may also be appropriately selected in consideration of the desired adhesion or cell gap maintaining efficiency, and the like. For example, when the partition spacer is applied, the pitch of the partition spacer may be in a range of 50 μm to 2,000 μm. For example, if the partition spacer is a honeycomb type, the pitch is obtained through the interval of opposite sides in the hexagon forming the honeycomb, and in the case of a tetragon, the pitch is obtained through the length of the sides of the tetragon. In the case where the intervals of the sides facing each other in the hexagon forming the honeycomb or the lengths of the sides of the tetragon are not constant, an average value of them may be defined as the pitch.

When the partition wall spacer constitutes a closed figure, for example, the area of the closed figure (i.e., the area of, for example, the hexagon or the quadrangle) may be, for example, in a range of about 1 to 200 mm$^2$. When a plurality of closed figures are formed by the partition wall spacers and the closed figures have different areas, the area is an arithmetic mean value.

The line width of the partition spacer, for example, the width of each wall of the hexagon forming the honeycomb, or the tetragon, may be in a range of, for example, about 5 μm to 50 μm. In another example, the line width may be about 10 μm or more, or 15 μm or more, or may also be 45 μm or less, 40 μm or less, 35 μm or less, 30 μm or less, 25 μm or less, or 20 μm or less or so.

In such a range, the cell gap may be properly maintained, and adhesion between substrates may also be maintained excellently. For example, when the pressure-sensitive adhesive layer or the adhesive layer is formed on the first substrate, the combination with the partition wall spacer can provide excellent adhesive force between the substrates.

As a component for applying an external signal to the light modulation layer, an electrode layer may be formed on each substrate of the light modulating device. For example, the electrode layer may be present between the first surface and the functional layer (the liquid crystal alignment film, the pressure-sensitive adhesive or adhesive layer) in the first substrate (between 100 and 1001 in FIG. 2) and/or between the first surface and the liquid crystal alignment film in the second substrate (between 200 and 2001 in FIG. 2) (if a spacer is present, between the spacer and the alignment film). In the case of the second substrate, it is common that first, an electrode layer is formed on the first surface, and a spacer and an alignment film are formed thereon sequentially, so that when a spacer is present, the electrode layer may be located between the first surface of the second substrate and the spacer and alignment film.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

The light modulating device may comprise other additional constitutions as necessary, while basically comprising the light modulating device. That is, depending on the driving mode, the implementation of the above-described transparent, black, high reflection and/or low reflection mode and switching between them are possible even with the light modulating device alone, but in order to facilitate the implementation or switching of these modes, it is also possible to include additional components.

Figure 3:
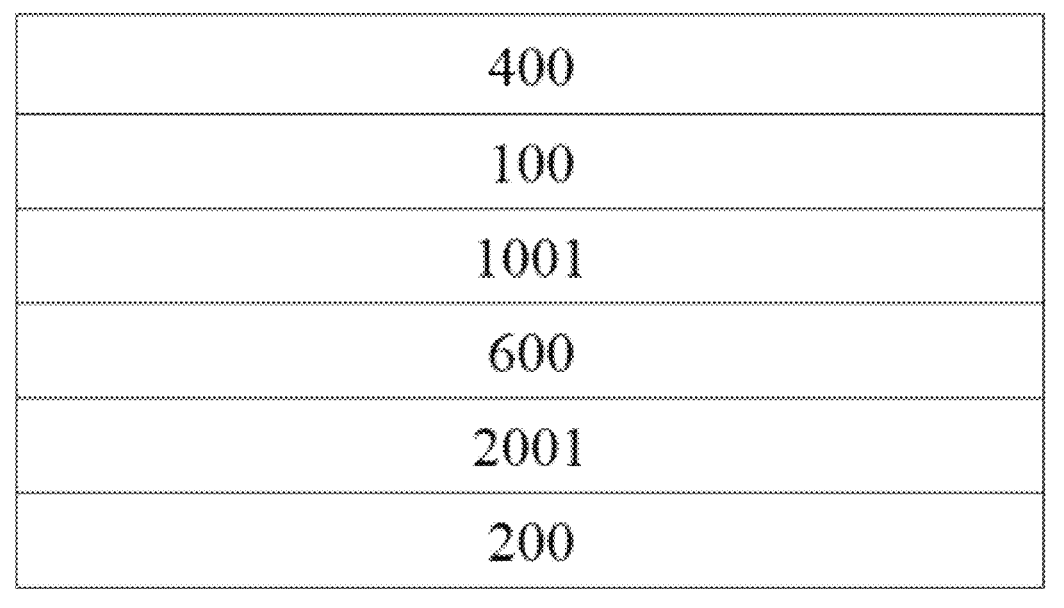
Figure 4:
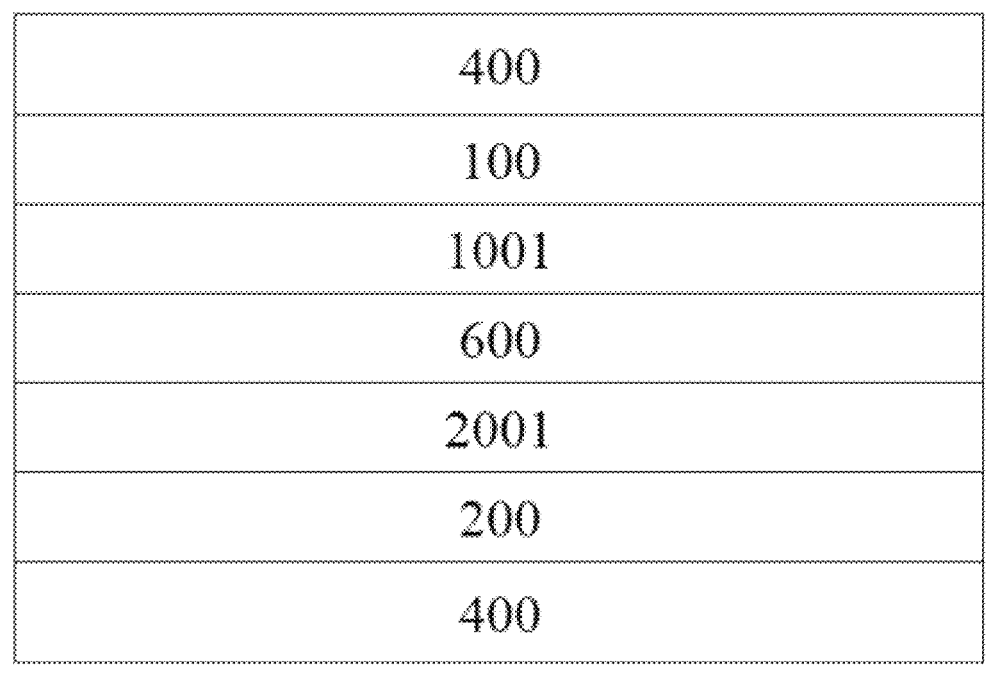

For example, the device may further comprise a polarization layer (passive polarization layer) disposed on one side or both sides of the light modulating device. FIG. 3 is, as an example of the above structure, the case where in the structure of FIG. 2, the polarization layer (400) is disposed only on one side of the light modulating device, and FIG. 4 is the case where in the structure of FIG. 2, the polarization layer (400) is disposed on both sides of the light modulating device. In addition, when the partition spacer is applied as the spacer and the shape is a tetragon (square or rectangle), the sides of the tetragon and the absorption axis of the polarization layer are suitably disposed to be substantially vertical or horizontal to each other.

The term polarization layer may mean an element that converts natural light or unpolarized light into polarized light. In one example, the polarization layer may be a linear polarization layer. The linear polarization layer means a case where the selectively transmitting light is linearly polarized light that vibrates in any one direction and the selectively absorbing or reflecting light is linearly polarized light that vibrates in directions orthogonal to the vibration direction of the linearly polarized light. That is, the linear polarization layer may have a transmission axis and absorption axes or reflection axes orthogonal to each other in the plane direction.

The polarization layer may be an absorptive polarization layer or a reflective polarization layer. As the absorptive polarization layer, for example, a polarization layer in which iodine is dyed to a polymer stretched film such as a PVA stretched film, or a guest-host polarization layer in which liquid crystals polymerized in an oriented state are used as a host and dichroic dyes arranged along the orientation of the liquid crystals are used as a guest may be used, without being limited thereto.

As the reflective polarization layer, for example, a reflective polarization layer known as a so-called DBEF (dual brightness enhancement film) or a reflective polarization layer formed by coating a liquid crystal compound such as LLC (lyotropic liquid crystal) may be used, but is not limited thereto.

As shown in FIG. 4, it may have a structure in which the polarization layers are disposed on both sides of the light modulating device. In this case, the angle formed by the transmission axes of the polarization layers disposed on both sides may be in the range of 85 degrees to 95 degrees, or approximately perpendicular.

In one example, the optical device may also be configured without comprising any polarization layer. For example, an optical device may also be configured without applying any polarization layer after blending a dichroic dye as an additional component in the liquid crystal layer.

The light modulating device may comprise other necessary constitutions in addition to the above constitutions.

For example, the light modulating device may further comprise an optically anisotropic film satisfying the refractive index relationship of Equation 3 below. Such a film may further improve the performance of the device by optically compensating for the substrate or the light modulation layer.

$$nz<ny \quad \text{[Equation 3]}$$

In Equation 3, ny is the refractive index of the optically anisotropic film for a wavelength of 550 nm in the fast axis direction, and nz is the refractive index of the optically anisotropic film for a wavelength of 550 nm in the thickness direction.

The optically anisotropic film satisfying the relationship of Equation 3 above is a film exhibiting the properties of a so-called negative C plate.

The thickness direction phase difference of such an optically anisotropic film may be, for example, in a range of less than 0 nm to −600 nm or more based on a wavelength of 550 nm. The optically anisotropic film may also exist in one layer or two or more layers in the optical device, and when the optically anisotropic film exists in one layer, the thickness direction phase difference is the thickness direction phase difference of the one layered-film, and when it exists in a plurality of two or more layers, it is the sum of thickness direction phase differences of all films.

In addition, the thickness direction phase difference is a physical quantity determined by Equation 4 below.

$$Rth=d \times (nz-ny) \quad \text{[Equation 4]}$$

In Equation 4, Rth is the thickness direction phase difference, nz is the thickness direction refractive index of the film, ny is the fast axis direction refractive index of the film, and d is the thickness of the film. Here, the meanings of the thickness direction and the fast axis are known in the industry.

As the optically anisotropic film, a film satisfying Equation 3 above, which is a known retardation film, may be applied, and as this type of film, for example, stretched polymer films or liquid crystal films, and the like are variously known in the industry.

The optically anisotropic film may be present on the first and/or second substrate, which may be formed, for example, on the first surface of the first and/or second substrate. At this time, the optically anisotropic film may be present between the first and/or second substrate and the light modulation layer; when the liquid crystal alignment film, or the pressure-sensitive adhesive layer or adhesive layer (liquid crystal alignment film, etc.) is formed on the first surface, it may be formed between the first and/or second substrate and the liquid crystal alignment film, etc.; and when an electrode layer is formed on the first surface, it may also be formed between the first and/or second substrate and the electrode layer.

The light modulating device may comprise other constitutions, if necessary, in addition to the above constitutions. For example, any other constitution necessary for driving or using the light modulating device, such as a pressure-sensitive adhesive layer or adhesive layer for attaching other components in addition to the pressure-sensitive adhesive layer or adhesive layer formed on the first surface of the first substrate, a hard coating film, an antireflection film and/or an NIR (near-infrared) cut layer, may be added.

A method for manufacturing the light modulating device is not particularly limited, and the device may be manufactured through a known method except that the above elements are applied as each component.

Such an optical device can be used for various applications, and can be used, for example, in eyewear such as sunglasses or eyewear for AR (augmented reality) or VR (virtual reality), exterior walls of buildings or sunroofs for vehicles, and the like.

The present invention provides a window comprising the light modulating device and a sunroof comprising the light modulating device.

Effects of Invention

The present disclosure can provide a light modulating device that can stably maintain designed optical properties even after an encapsulation process in which a pressure is applied, such as an autoclave process, an optical device or a manufacturing method thereof. The present disclosure can also provide a light modulating device, which can also stably maintain the orientation state of a light modulation layer while effectively securing adhesive force between upper and lower substrates, an optical device comprising the same or a manufacturing method thereof.

MODE FOR INVENTION

Hereinafter, the present disclosure will be described in detail through Examples, but the scope of the present disclosure is not limited by Examples below.

1. Measurement of Transmittance $T_1$ and $T_2$

Transmittance $T_1$ and $T_2$ were measured for the light modulating devices manufactured in Examples or Comparative Examples. At this time, the light modulating device applied to the measurement is a device before attaching a PVA (poly(vinyl alcohol)) polarization layer to the second surfaces of the first and second substrates. In addition, the light modulating devices of Examples or Comparative Examples were devices configured so that the initial orientation was vertical orientation, so that transmittance $T_1$ and $T_2$ were measured without applying a separate power source.

In an Olympus BX51 polarization microscope, the optical absorption axes of the built-in polarizers were set to be orthogonal to each other, and after turning on the metal halide light source of the microscope, a Linkam LTS420 hot stage was installed on the microscope stage. The sample (the light modulating device) was placed on the Linkam LTS420 hot stage. At this time, the slow axis of the substrate of the light modulating device was made to be parallel to the light absorption axis of one of the polarizers built in the BX51 polarization microscope. In this state, transmittance $T_1$ was measured. The transmittance was measured by installing StellarNet's Blue-Wave, UVN spectrometer on the microscope, and the measurement wavelength was set in the visible light wavelength range (about 380 nm to 770 nm).

After measuring the transmittance $T_1$, the temperature of the Linkam LTS420 hot stage was set to 100° C., and maintained there for 5 minutes.

After maintaining in the high temperature condition, transmittance $T_2$ was measured in the same manner as the transmittance $T_1$. However, immediately after maintaining at 100° C. for 5 minutes using the Linkam LTS420 hot stage, the transmittance $T_2$ was measured while maintaining the temperature as it was.

2. Phase Difference Evaluation

The in-plane retardation value (Rin) of the film was measured for light having a wavelength of 550 nm using a UV/VIS spectroscope 8453 instrument from Agilent Co., Ltd. Two sheets of polarizers were installed in the UV/VIS spectroscope so that their transmission axes were orthogonal to each other, and a polymer film was installed between the two sheets of polarizers so that its slow axis formed 45 degrees with the transmission axes of the two polarizers, respectively, and then the transmittance according to wavelengths was measured. The phase retardation order of each peak is obtained from the transmittance graph according to wavelengths. Specifically, a waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the Rin value for light having a wavelength of 550 nm.

$T=\sin^2[(2\pi R/\lambda)]\text{tm}$ [Equation A]

$T=\sin^2[((2n+1)\pi/2)]$ [Equation B]

$n=(\lambda n-3\lambda n+1)/(2\lambda n+1+1-2\lambda n)$ [Equation C]

In the above, R denotes in-plane retardation (Rin), λ denotes a wavelength, and n denotes a nodal degree of a sine waveform.

3. Thickness Evaluation

Thicknesses of a liquid crystal layer and a silicone pressure-sensitive adhesive layer were confirmed using a measuring device (F20, manufactured by Filmetric). Here, the thickness of the liquid crystal layer was the cell gap, which was confirmed through the height of the spacer.

Example 1

Manufacture of Light Modulating Device

As a first substrate of a light modulating device, a PET (poly(ethylene terephthalate)) film (SKC, highly stretched PET product) having a thickness of 145 μm or so, in which an ITO (indium tin oxide) electrode layer was deposited on one side, was used. The in-plane phase difference (550 nm) of the PET film was approximately 10,000 nm or so. A silicone pressure-sensitive adhesive layer was formed on the ITO electrode layer surface of the PET film.

A pressure-sensitive adhesive solution prepared by adding a catalyst (Shin-Etsu, CAT-PL-56) and a compound of Formula A below to a silicone pressure-sensitive adhesive precursor solution (manufactured by Shin-Etsu Chemical, KR-3700), in which a silicone pressure-sensitive adhesive precursor was dissolved in toluene as a solvent at a solid concentration of about 60 weight %, was bar-coated on the ITO layer, and maintained at about 150° C. or so for 5 minutes to form the silicone pressure-sensitive adhesive layer to a thickness of 8 μm or so. Here, the weight ratio (precursor (excluding solvent): catalyst: compound of Formula A) of the silicone pressure-sensitive adhesive precursor, the catalyst and the compound of Formula A is 60:0.5:6.7.

Since the weight ratio of the silicone pressure-sensitive adhesive precursor (manufactured by Shin-Etsu Chemical, KR-3700), the catalyst (Shin-Etsu, CAT-PL-56) and the compound of Formula A in the pressure-sensitive adhesive solution is about 60:0.5:6.7, the A value according to the following equation 2 in the formed pressure-sensitive adhesive layer is about 0.1.

As a second substrate, a PET (poly(ethylene terephthalate)) film (manufactured by Toyobo, SRF product) having a thickness of 80 μm or so, in which an ITO (indium tin oxide) layer was deposited on the first surface, was used. The in-plane phase difference (550 nm) of the PET film was approximately 9,000 or so. On the ITO layer of the PET film, partition wall spacers having a pitch of about 350 μm or so, a line width of about 10 μm or so and a height of 6 μm or so as quadrangular partition wall spacers were formed with an area ratio (ratio of the area occupied by the spacers in the total substrate area) of about 9%. A vertical alignment film (5661LB3, Nissan) was formed on the spacers. The alignment film material (5661LB3, Nissan) was diluted in a solvent to have a solid content of about 2.2 weight %, #2 bar-coated and then maintained at 100° C. for 10 minutes or so to form the alignment film. The vertical alignment film was formed by rubbing it in one direction. The rubbing direction was made to be perpendicular to the slow axis direction of the second substrate.

Subsequently, a liquid crystal composition was coated on the surface of the vertical alignment film of the second substrate, and the pressure-sensitive adhesive layer of the first substrate was laminated to face the coated surface of the liquid crystal composition. At this time, the positions of the slow axes of the first and second substrates were adjusted such that the axes were parallel to each other.

Here, as the liquid crystal composition, a composition comprising a liquid crystal compound (Merck, MAT-19-1205) and a chiral dopant (Merck, 5811) was used. The content of the chiral dopant was adjusted so that the pitch (chiral pitch) (p) of the twisted orientation was about 20 μm or so.

Subsequently, a PVA (poly(vinyl alcohol)) polarization layer was attached to each of the second surfaces of the first and second substrates. At this time, the absorption axis of the PVA polarization layer attached to the second substrate was made to be perpendicular to the slow axis of the second substrate, and the absorption axis of the PVA polarization layer attached to the first substrate was made to be parallel to the slow axis of the first substrate.

$$A=S/(S+O) \quad \text{[Equation 2]}$$

In Equation 2, S is the weight of the silicon compound (compound of Formula A in the case of Example 1) in the pressure-sensitive adhesive layer, and O is the weight of the pressure-sensitive adhesive layer excluding the silicon compound.

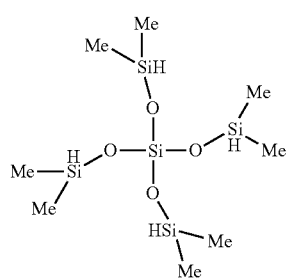

[Formula A]

Example 2

A light modulating device was manufactured in the same manner as in Example 1, except that the silicone pressure-sensitive adhesive layer was formed to have a thickness of about 10 μm or so.

Example 3

A light modulating device was manufactured in the same manner as in Example 1, except that the ratio of the compound of Formula A was adjusted so that the A value of Equation 2 was about 0.125, and the thickness of the silicone adhesive layer was about 6 μm or so.

Example 4

A light modulating device was manufactured in the same manner as in Example 1, except that a compound of Formula B below was applied instead of the compound of Formula A, the ratio of the compound of Formula B was adjusted so that the A value of Equation 2 was about 0.15, and the thickness of the silicone adhesive layer was about 8 μm or so.

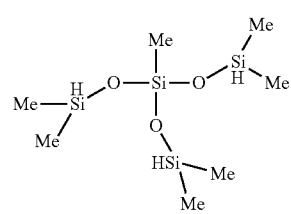

[Formula B]

Comparative Example 1

A light modulating device was manufactured in the same manner as in Example 1, except that a compound of Formula C below was applied instead of the compound of Formula A, the ratio of the compound of Formula C was adjusted so that the A value of Equation 2 was about 0.15, and the thickness of the silicone adhesive layer was about 4 μm or so.

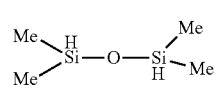

[Formula C]

Comparative Example 2

A light modulating device was manufactured in the same manner as in Example 1, except that the compound of Formula C in Comparative Example 1 was applied instead of the compound of Formula A, the ratio of the compound of Formula C was adjusted so that the A value of Equation 2 was about 0.15, and the thickness of the silicone adhesive layer was about 15 μm or so.

Comparative Example 3

A light modulating device was manufactured in the same manner as in Example 1, except that a compound of Formula D below was applied instead of the compound of Formula A, and the thickness of the silicone adhesive layer was about 5 μm or so.

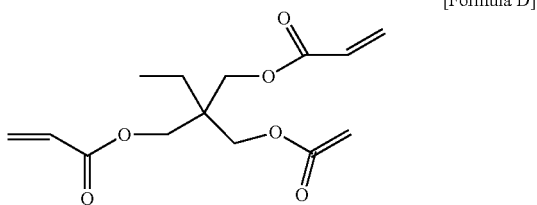

[Formula D]

Comparative Example 4

A light modulating device was manufactured in the same manner as in Example 1, except that the compound of Formula D in Comparative Example 3 was applied instead of the compound of Formula A, and the thickness of the silicone pressure-sensitive adhesive layer was about 12 μm or so.

Comparative Example 5

A light modulating device was manufactured in the same manner as in Example 1, except that a compound of Formula E below was applied instead of the compound of Formula A, and the thickness of the silicone pressure-sensitive adhesive layer was about 3.6 μm or so.

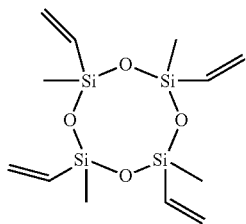

[Formula E]

Comparative Example 6

A light modulating device was manufactured in the same manner as in Example 1, except that the compound of Formula E in Comparative Example 5 was applied instead of the compound of Formula A, and the thickness of the silicone pressure-sensitive adhesive layer was about 14 μm or so.

The K values for the pressure-sensitive adhesive layers of Examples and Comparative Examples were summarized and described in Tables 1 and 2 below.

TABLE 1

|  | Example | | | |
|---|---|---|---|---|
|  | 1 | 2 | 3 | 4 |
| A (determined by Equation 2 below) | 0.1 | 0.1 | 0.125 | 0.15 |
| D (thickness of pressure-sensitive adhesive layer, μm) | 8 | 10 | 6 | 8 |
| B (number of dialkylsiloxy groups in silicon compound) | 4 | 4 | 4 | 3 |
| K = A × B × D | 3.2 μm | 4 μm | 3 μm | 3.6 μm |

(Equation 2) A = S/(S + O)

In Equation 2, S is the weight of the silicon compound in the pressure-sensitive adhesive layer, and O is the weight of the pressure-sensitive adhesive layer excluding the silicon compound.

TABLE 2

|  | Comparative Example | | | | | |
|---|---|---|---|---|---|---|
|  | 1 | 2 | 3 | 4 | 5 | 6 |
| A (determined by Equation 2 below) | 0.15 | 0.15 | 0.15 | 0.15 | 0.15 | 0.15 |
| D (thickness of pressure-sensitive adhesive layer, μm) | 4 | 15 | 5 | 12 | 3.6 | 14 |
| B (number of dialkylsiloxy groups in silicon compound) | 2 | 2 | 0 | 0 | 0 | 0 |
| K = A × B × D | 1.2 μm | 4.5 μm | 0 μm | 0 μm | 0 μm | 0 μm |

(Equation 2) A = S/(S + O)

In Equation 2, S is the weight of the silicon compound in the pressure-sensitive adhesive layer, and O is the weight of the pressure-sensitive adhesive layer excluding the silicon compound.

The above-confirmed transmittance $T_1$ and $T_2$ for the light modulating devices of Examples and Comparative Examples were summarized and described in Table 3 below.

TABLE 3

|  | Example | | | | Comparative Example | | | | | |
|---|---|---|---|---|---|---|---|---|---|---|
|  | 1 | 2 | 3 | 4 | 1 | 2 | 3 | 4 | 5 | 6 |
| Transmittance $T_1$(%) | 0.2 | 0.2 | 0.2 | 0.2 | 0.2 | 0.2 | 0.2 | 0.2 | 0.2 | 0.2 |
| Transmittance $T_2$(%) | 0.2 | 0.2 | 0.2 | 0.2 | 4.7 | 5.5 | 5.5 | 5.5 | 5.5 | 5.4 |

From the results of Table 3, it can be confirmed that the light modulating device according to the present disclosure maintains the designed liquid crystal orientation property (vertical orientation property) stably before and after maintaining the high temperature, whereby the transmittance $T_1$ and $T_2$ are equally measured. The vertical orientation property of the light modulating device at high temperatures was further confirmed in another way. The vertical orientation property was evaluated while irradiating one side of the light modulating device with light and while changing the ambient temperature of the device using a temperature control device (LTS-350, Linkam) without applying an external signal to the device. The orthogonal polarization layers are disposed on both sides of the light modulation layer, and thus if the vertical orientation is properly maintained, light leakage is not induced in the light modulating device on the opposite side to the side to which the light is irradiated. The vertical orientation property was evaluated in the above manner while the temperature of the device was maintained at 100° C., and the results were summarized in Table 4 below. In Table 4 below, P is a case where light leakage does not occur (when the vertical orientation is stably maintained), and N is a case where light leakage occurs (when the vertical orientation state is not maintained).

TABLE 4

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Vertical Orientation Property | P | P | P | P | N | N | N | N | N | N |

As summarized in Table 4, it was observed that in the devices of Examples, the vertical orientation of the initial state was stably maintained even at high temperatures, whereby light leakage did not occur, but in the devices of Comparative Examples, vertical orientation state was broken at high temperatures, whereby light leakage occurred.

FIG. 5 is a result of evaluating the light leakage for Example 1, and FIG. 6 is a result for Comparative Example 1.

The invention claimed is:

1. A light modulating device, comprising:
   a first substrate;
   a second substrate; and
   a liquid crystal layer,
   wherein each of the first and second substrates has a first surface and a second surface,
   wherein the first surfaces of the first and second substrates face each other,
   wherein the liquid crystal layer is disposed between the first and second substrates, and
   wherein the light modulating device satisfies Equation 1 below:

$$T_2 \leq 3 \times T_1 \qquad \text{[Equation 1]}$$

wherein, $T_1$ is an initial transmittance measured after vertically orienting the liquid crystal layer and placing it between orthogonal polarizers, and $T_2$ is a transmittance measured after heating the liquid crystal layer showing the transmittance of $T_1$ at 100° C. for 5 minutes, and then placing it between the orthogonal polarizers.

2. The light modulating device according to claim 1, wherein the transmittance $T_2$ is 2% or less.

3. The light modulating device according to claim 1, wherein the liquid crystal layer is capable of being switched between a vertical orientation state and a twisted orientation state.

4. The light modulating device according to claim 1, wherein no liquid crystal alignment film is formed on the first substrate.

5. The light modulating device according to claim 1, wherein a liquid crystal alignment film is formed on the first surface of the second substrate.

6. The light modulating device according to claim 1, wherein the first or second substrate has an in-plane phase difference of 500 nm or more for light with a wavelength of 550 nm.

7. The light modulating device according to claim 1, further comprising a polarization layer disposed on the second surface of the first or second substrate.

8. The light modulating device according to claim 1, further comprising an optically anisotropic film disposed between the first or second substrate and the liquid crystal layer, and satisfying Equation 3 below:

$$nz < ny \qquad \text{[Equation 3]}$$

wherein, ny is the refractive index of the optically anisotropic film for a wavelength of 550 nm in the fast axis direction, and nz is the refractive index of the optically anisotropic film for a wavelength of 550 nm in the thickness direction.

9. A window comprising the light modulating device of claim 1.

10. A sunroof comprising the light modulating device of claim 1.

* * * * *